UNITED STATES PATENT OFFICE.

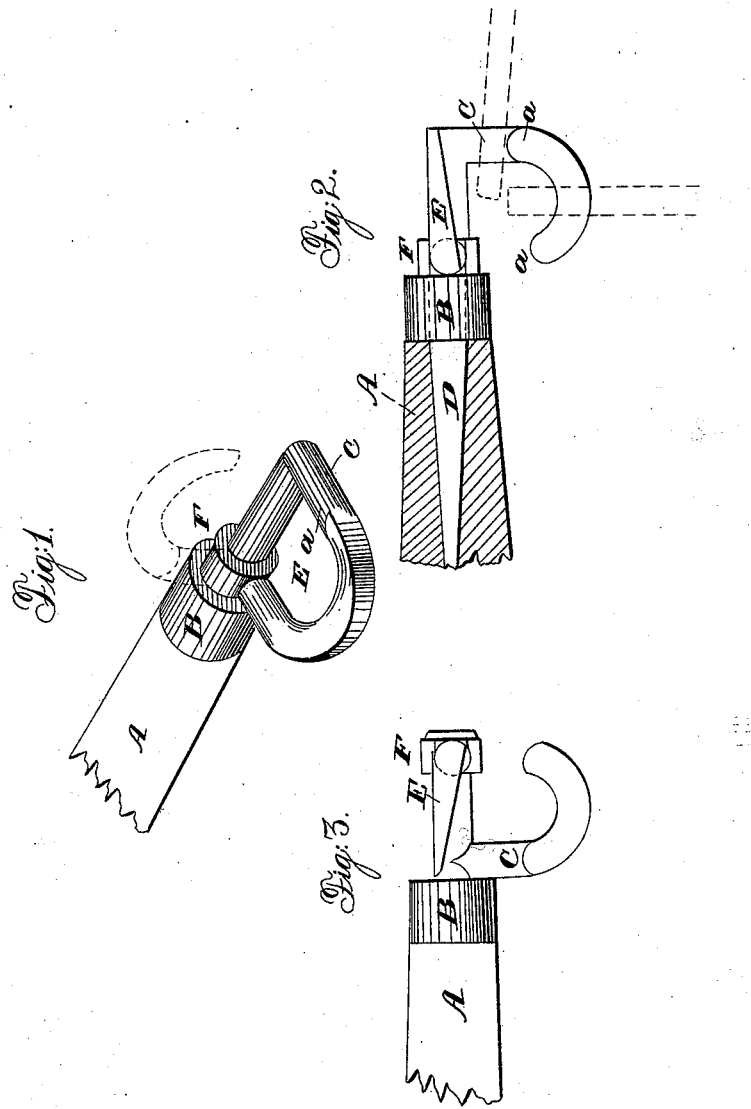

J. B. SHAW, OF NEW HAVEN, CONNECTICUT.

IMPROVEMENT IN TRACE-LOCK.

Specification forming part of Letters Patent No. 46,590, dated February 28, 1865.

*To all whom it may concern:*

Be it known that I, J. B. SHAW, of New Haven, in the county of New Haven and State of Connecticut, have invented a new and useful Improvement in Trace-Locks; and I do hereby declare the following to be a full, clear, and exact description of the same, when taken in connection with the accompanying drawings and the letters of reference marked thereon, and which said drawings constitute part of this specification, and represent, in—

Figure 1, a perspective view; Fig. 2, a top or plan view, and in Fig. 3 a different construction of the same invention.

My invention relates to improvement in securing the traces of a horse's hames to the whiffletree.

To enable others skilled in the art to make and use my invention, I will proceed to fully describe the same, as illustrated in the accompanying drawings.

The contrivances for securing traces to the whiffletree are many and various, but as a general thing the introduction of a spring or its equivalent is required in their construction, which soon becomes useless from breakage or ill usage. The necessity for a trace-lock in which such difficulties or dangers did not exist has suggested my improvement.

A is a common whiffletree, its end bound by a metallic ring or band, B. C is a hook formed with a shank, D, and driven into the end of the whiffletree, (as seen in Fig. 2,) made of round metal and flattened upon the upper side, commencing at *a*, and gradually thinner to the point *d*. (See Figs. 1 and 2.) E is a second hook, formed with an eye, F, through which the shank D of the hook C is passed, and so as to turn freely thereon. The hook E is curved to correspond with the hook C, and is flattened in similar manner upon the under side, so as to fit the flattened side of the hook C, and the two together to form a round body, as seen in Fig. 1.

To attach the trace, turn up the loose hook E, (as denoted in red, Fig. 1, and seen in black, Fig. 2,) place the eye of the trace H over the hook C to the position in red, Fig. 2, so as to allow the hook E to drop down into its place, as in Fig. 1; then allow the trace to assume its natural position, as in black, Fig. 2. The eye of the trace will encircle both hooks and cannot be removed until the trace is again turned to the position in red, as before described, so as to allow the hook E to be raised from the hook C, as before.

Thus I construct a strong and positively safe trace-lock, adapted to all kinds of eyes, cheap and durable in construction.

In Fig. 3 the same arrangement is illustrated, with this difference, that the swinging hook E is placed at the end of the shank, while the hook C is formed solidly to the shank, close to the end of the whiffletree. I prefer the first-described as equally as good and cheaper in construction.

Having fully described my invention, what I claim as new and useful, and desire to secure by Letters Patent, is—

The herein-described trace-lock, constructed substantially as specified.

J. B. SHAW.

Witnesses:
 JOHN E. EARLE,
 RUFUS SANFORD.